United States Patent
Hu et al.

(10) Patent No.: US 10,929,621 B2
(45) Date of Patent: Feb. 23, 2021

(54) GATEWAY DEVICE AND METHOD FOR MANAGING MULTIPLE ELECTRONIC TAGS

(71) Applicant: BOE Technology Group Co., Ltd., Beijing (CN)

(72) Inventors: Kejun Hu, Beijing (CN); Tao Li, Beijing (CN); Zhiguo Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 13 days.

(21) Appl. No.: 16/464,249

(22) PCT Filed: Nov. 27, 2018

(86) PCT No.: PCT/CN2018/117702
§ 371 (c)(1),
(2) Date: May 24, 2019

(87) PCT Pub. No.: WO2019/200924
PCT Pub. Date: Oct. 24, 2019

(65) Prior Publication Data
US 2020/0285820 A1    Sep. 10, 2020

(30) Foreign Application Priority Data

Apr. 20, 2018  (CN) .......................... 201810359628.9

(51) Int. Cl.
*G06K 7/10*    (2006.01)
*G06F 13/42*   (2006.01)
*G06K 19/07*   (2006.01)

(52) U.S. Cl.
CPC ..... *G06K 7/10366* (2013.01); *G06F 13/4204* (2013.01); *G06F 13/4282* (2013.01);
(Continued)

(58) Field of Classification Search
None
See application file for complete search history.

(56) References Cited

FOREIGN PATENT DOCUMENTS

| CN | 101562584 A | 10/2009 |
| CN | 202533995 U | 11/2012 |

(Continued)

OTHER PUBLICATIONS

International Search Report & Written Opinion dated Feb. 27, 2019, regarding PCT/CN2018/117702.

*Primary Examiner* — Kristy A Haupt
(74) *Attorney, Agent, or Firm* — Intellectual Valley Law, P.C.

(57) ABSTRACT

The present application discloses a gateway device for managing multiple electronic tags. The gateway device includes a network modem configured to receive updated data for multiple electronic tags. Additionally, the gateway device includes a communication chip configured to transmit individual updated data for each individual electronic tag one by one to the corresponding individual electronic tag of the multiple electronic tags. Moreover, the gateway device includes a microcontroller coupled with the network modem and the communication chip to control receiving the updated data for the multiple electronic tags from the network modem and transmitting multiple individual updated data respectively to the multiple electronic tags.

13 Claims, 5 Drawing Sheets

(52) U.S. Cl.
 CPC .. *G06K 19/0702* (2013.01); *G06F 2213/0002* (2013.01); *G06F 2213/0016* (2013.01); *G06F 2213/0042* (2013.01)

(56) References Cited

FOREIGN PATENT DOCUMENTS

| | | | | |
|---|---|---|---|---|
| CN | 103297334 A | 9/2013 | | |
| CN | 106255235 A | 12/2016 | | |
| CN | 107133543 A | 9/2017 | | |
| CN | 107145917 A | * 9/2017 | ......... | G06K 17/0029 |
| CN | 107145917 A | 9/2017 | | |
| CN | 107145918 A | 9/2017 | | |
| CN | 107343259 A | 11/2017 | | |

\* cited by examiner

GATEWAY DEVICE AND METHOD FOR MANAGING MULTIPLE ELECTRONIC TAGS

CROSS-REFERENCE TO RELATED APPLICATION

This application is a national stage application under 35 U.S.C. § 371 of International Application No. PCT/CN2018/117702 filed Nov. 27, 2018, which claims priority to Chinese Patent Application No. 201810359628.9, filed Apr. 20, 2018, the contents of which are incorporated by reference in the entirety.

TECHNICAL FIELD

The present invention relates to wireless communication and embedded system, more particularly, to a gateway device and a method for managing multiple electronic tags.

BACKGROUND

Gateway is a computer system or embedded system product served as a portal for communicating between two programs or networks of different systems using different protocols to share information. A gateway device provides many functions including protocol conversion, routing selection, and data exchange. Related gateway devices for managing multiple electronic tags have drawbacks in complicated system structure, high cost, and low data update rate.

SUMMARY

In an aspect, the present disclosure provides a gateway device for managing multiple electronic tags. The gateway device includes a network modem configured to receive updated data for multiple electronic tags. Additionally, the gateway device includes a communication chip configured to transmit the updated data for each individual electronic tag one by one to the corresponding individual electronic tag of the multiple electronic tags. Moreover, the gateway device includes a microcontroller coupled with the network modem and the communication chip to control receiving the updated data for the multiple electronic tags from the network modem and transmitting the updated data for each individual electronic tag of the multiple electronic tags respectively to each corresponding one of the multiple electronic tags and receiving update feedback information from each electronic tag that has been updated.

Optionally, the gateway device further includes a flash memory coupled to the microcontroller to store the updated data for the multiple electronic tags and the update feedback information from each electronic tag that has been updated. The flash memory includes one memory device controlled by the microcontroller. The one memory device is selected from a NOR flash through a Serial Peripheral Interface (SPI) or Parallel Bus Interface (PBI), a Secure Digital (SD) card and NAND flash through Secure Digital Input Output (SDIO) interface.

Optionally, the microcontroller is configured to split the updated data to multiple individual updated data respectively for individual electronic tag of the multiple electronics tags. The microcontroller is also configured to control the communication chip to transmit each of the multiple individual updated data to corresponding individual electronic tag through a wireless communication protocol selected from a universal asynchronous receiver-transmitter (UART), a Serial Peripheral Interface (SPI), I2C interface, and Universal Serial Bus (USB).

Optionally, the communication chip is configured to receive the update feedback information and/or battery power level information from the individual electronic tag and transmit the update feedback information and/or battery power level information to the microcontroller through a wireless communication protocol selected from a universal asynchronous receiver-transmitter (UART), a Serial Peripheral Interface (SPI) I2C interface, and Universal Serial Bus (USB).

Optionally, the microcontroller is configured to process the update feedback information and/or battery power level information from the multiple electronic tags that have been updated and determine update completion information for the individual electronic tag based on the update feedback information from the multiple electronic tags.

Optionally, the microcontroller is configured to determine at least one of the update feedback information, the battery power level information, and the update completion information stored in the flash memory to be uploaded through the network modem to a server based on network connection status monitored by the network modem, and to control the network modem to upload at least one of the update feedback information, the battery power level information, and the update completion information stored in the flash memory once network connection recovers from any network connection failure.

Optionally, the microcontroller is configured to record a time interval for the communication chip to transmit a first updated data for a first electronic tag of the multiple electronic tags to the first electronic tag. The microcontroller is also configured to control the communication chip to re-transmit the first updated data for the first electronic tag to the first electronic tag if the update feedback information from the first electronic tag is not transmitted by the communication chip to the microcontroller within a pre-scheduled time interval.

Optionally, the network modem is configured to receive instructions from a server for operating the gateway device. The instructions include at least one of a wake-up command, an update command, and a stop-update command. The wake-up command is for instructing the gateway device to assign storage spaces in the flash memory to store the updated data for the electronic tag. The update command is for instructing the gateway device to begin transmitting the updated data stored in the flash memory to the electronic tag. The stop-update command is for instructing the gateway device to stop transmitting the updated data stored in the flash memory to the electronic tag.

Optionally, the network modem is connected to a server wirelessly via a Wi-Fi network or through a wired connection via an Ethernet network.

Optionally, the communication chip includes a system-on-chip configured to communicate with multiple electronic tags in s personal area network via one communication protocol selected from Bluetooth Low Energy (BLE) protocol, 2.4 GHz private protocol, and Sub-GHz protocol.

Optionally, the microcontroller includes a C/OS operation system configured to perform multiple tasks in real time.

In another aspect, the present disclosure provides a method for managing multiple electronic tags. The method includes receiving updated data for multiple electronic tags. Additionally, the method includes transmitting one of the updated data for an individual electronic tag to the corresponding individual electronic tag. Moreover, the method includes using a microcontroller to control receiving the updated data via a network modem and control transmitting individual updated data for an individual electronic tag one by one via a communication chip to the corresponding individual electronic tag.

Optionally, the method further includes using the microcontroller to control storing the multiple updated data of the multiple electronic tags received by the network modem into a flash memory coupled with the microcontroller through a Serial Peripheral Interface (SPI).

Optionally, the method further includes further includes splitting the updated data for the multiple electronic tags into multiple individual updated data. Furthermore, the method includes transmitting each of the multiple individual updated data to corresponding one of the multiple individual electronic tags wirelessly by the communication chip using a Bluetooth protocol.

Optionally, the method further includes receiving update feedback information and/or battery power level information from each of the multiple electronic tags wirelessly by the communication chip using the Bluetooth protocol. Moreover, the method includes transmitting the update feedback information and/or battery power level information from the communication chip via a universal asynchronous receiver-transmitter (UART) to the microcontroller.

Optionally, the method further includes storing the update feedback information and/or battery power level information to the flash memory. Additionally, the method includes determining update completion information of the electronic tag based on the update feedback information from the electronic tag.

Optionally, the method also includes monitoring network connection status including connection failure and connection recovery using the network modem.

Optionally, the method further includes determining at least one of the update feedback information, the battery power level information, and the update completion information stored in the flash memory to be uploaded through the network modem to the server based on the network connection status. Furthermore, the method includes controlling the network modem to upload at least one of the update feedback information, the battery power level information, and the update completion information stored in the flash memory through the network modem to the server once the network connection recovers from a failure.

Optionally, the step of transmitting each of the multiple individual updated data includes recording a time span for the communication chip to transmit each of the multiple individual updated data to corresponding one of the multiple electronic tags. The step of transmitting each of the multiple individual updated data further includes controlling the communication chip to re-transmit the individual updated data to the corresponding one of the multiple electronic tags if an update feedback information from the corresponding electronic tag is not received by the microcontroller within a pre-scheduled time interval.

Optionally, the method also includes receiving multiple commands from the server via the network modem. The multiple commands include at least one of a wake-up command, an update command, and a stop-update command. The wake-up command is to assign storage regions in the flash memory for the updated data of the electronic tag received by the network modem. The update command is to begin using the communication chip to transmit the updated data stored in the flash memory to the electronic tag. The stop-update command is to stop using the communication chip to transmit the updated data to the electronic tag.

In yet another aspect, the present disclosure provides a method for managing multiple electronic tags. The method includes starting system initialization and performing self-testing. The method further includes using a microcontroller to control a network modem to connect to a server and registering a network ID. Additionally, the method includes waiting for a wake-up command from the server and receiving and storing updated data of electronic tags. The method further includes waiting for an update command from the server. Furthermore, the method includes using the microcontroller to control a communication chip to connect to multiple electronic tags simultaneously. The method further includes updating data in each of the multiple electronic tags with a corresponding updated data. Moreover, the method includes using the network modem to monitor network connection status.

Optionally, the method further includes receiving update feedback information and battery power level information of the electronic tag by the communication chip if the network connection is normal. Additionally, the method includes determining by the microcontroller there is any information to be uploaded to the server. The method further includes uploading at least the update feedback information and/or the battery power level information to the server. Furthermore, the method includes determining an update completion information if each of the multiple electronic tags is updated with corresponding updated data. Moreover, the method includes monitoring network connection status.

Optionally, the method also includes storing update feedback information and battery power level information of the electronic tag to a memory if the network connection is not normal. Additionally, the method includes determining that at least one of the multiple electronic tags is not updated with corresponding updated data. Furthermore, the method includes controlling the communication chip to connect to the at least one electronic tag and transmit the updated data to the at least one electronic tag.

Optionally, determining by the microcontroller that at least an update feedback information to be uploaded to the server if the network connection is normal. Additionally, the method includes uploading the update feedback information and/or the battery power level information from the memory to the server. Furthermore, the method includes uploading the update completion information to the server.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Electronic racking system is an electronic equipment that can be disposed on shelf and used to replace traditional paper version price tag for goods. The Electronic racking system usually includes multiple electronic tags for marking commodity prices. The most updated price for each commodity can be displayed directly on a screen of the electronic tag, eliminating traditional low efficient, manual replacement of price tags.

Related electronic racking systems adopt a method for updating electronic tags one by one. When it is necessary to update data in an electronic tag, a server transmits an updated data of the electronic tag to the electronic racking system. The electronic racking system then performs data updating work to the electronic tag using the updated data before displaying the updated data. When an electronic tag finishes its updating work, the server transmits an updated data of another electronic tag to the electronic racking system. The electronic racking system then performs the data updating work again for the corresponding electronic tag. The process is repeated until all electronic tags that need to update data finish the data updating works.

The method for updating electronic tags one by one is low in efficiency, especially for large supermarket where huge quantities of commodities need to update data in corresponding electronic tags in a very short time. Additionally, if there is network connection failure or other system malfunctions during update of a large quantity of electronic tags, all subsequent data updating works are affected.

Figure 1:
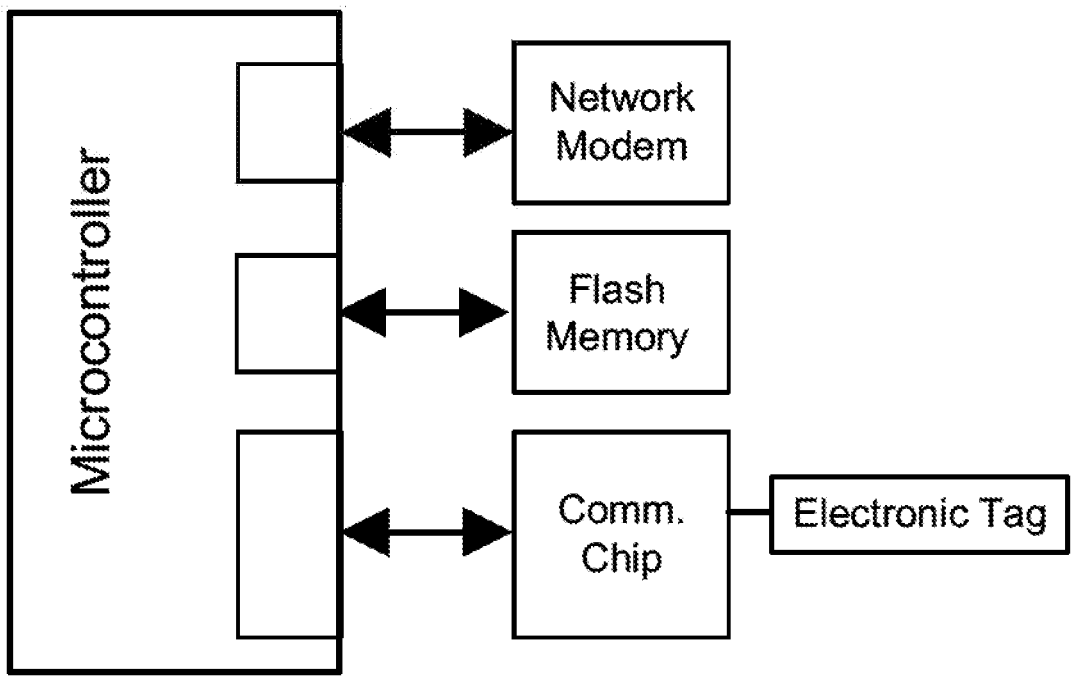
FIG. 1 is a block diagram of a gateway device according to some embodiments of the present disclosure.

Accordingly, the present disclosure provides, inter alia, a touch substrate, a gateway device and methods for managing multiple electronic tags that substantially obviate one or more of the problems due to limitations and disadvantages of the related art. In one aspect, the present disclosure provides a gateway device for managing multiple electronic tags in an electronic racking system. FIG. 1 is a block diagram of a gateway device according to some embodiments of the present disclosure. Referring to FIG. 1, the gateway device includes a network modem configured to receive updated data of electronic tags from a server. The updated data includes multiple individual update data respectively for multiple electronic tags. Optionally, the server sends the updated data for all electronic tags in one time to the network modem of the gateway device for updating corresponding electronic tags.

Additionally, the network modem is configured to receive a wake-up command sent by the server before receiving the updated data. In response to the wake-up command received by the network modem, the gateway device can perform an operation to assign storage spaces for respect updated data before the server sends a large quantity of updated data. After the operation to assign storage space is finished, the gateway device sends a feedback via the network modem to the server to notify the server that it is ready to receive the updated data (provided that the network connection is normal and the storage space is sufficient).

Referring to FIG. 1, the gateway device includes a communication chip configured to transmit each respective updated data for an electronic tag to each corresponding electronic tag of multiple electronic tags. The communication chip is connected to multiple electronic tags in the electronic racking system, and is able to communicate the gateway device with the multiple electronic tags via a wireless communication function to achieve data transmission between them. For example, after the gateway device via the network modem receives the updated data for multiple electronic tags, each individual updated data can be transmitted to corresponding electronic tag one by one by the communication chip so that every electronic tag can display the corresponding updated data. Optionally, the updated data is one-to-one correspondence with one electronic tag. Optionally, several electronic tags can correspond to one updated data. Optionally, the communication chip comprises a system-on-chip configured to communicate with multiple electronic tags in s personal area network via one communication protocol selected from Bluetooth Low Energy (BLE) protocol, 2.4 GHz private protocol, and Sub-GHz protocol.

Referring to FIG. 1, the gateway device includes a microcontroller configured to control the network modem to receive updated data of electronic tags and to control the communication chip to transmit an updated data to each corresponding electronic tag of multiple electronic tags. Optionally, the microcontroller is a main operational unit of the gateway device to control operations of the network modem and the communication chip. Optionally, the network modem is an interface between the microcontroller and a server. The interface may be achieved wirelessly using a Wi-Fi technology. Optionally, the interface may be achieved by wire connection through an Ethernet cable. Optionally, the communication chip is controlled by the microcontroller to transmit each of the multiple individual updated data to corresponding individual electronic tag through a wireless communication protocol selected from a universal asynchronous receiver-transmitter (UART), a Serial Peripheral Interface (SPI), I2C interface, and Universal Serial Bus (USB). Optionally, the communication chip is configured to receive the update feedback information and/or battery power level information from the individual electronic tag and to transmit the update feedback information and/or battery power level information to the microcontroller through a wireless communication protocol selected from a universal asynchronous receiver-transmitter (UART), a Serial Peripheral Interface (SPI), I2C interface, and Universal Serial Bus (USB).

In an embodiment, the gateway device also includes a memory for storing the updated data of electronic tags. Optionally, the memory can be an external memory device connected to the microcontroller via an interface. When a large quantity of updated data is received, the gateway device can use the memory to store the data in real time to guarantee the integrity of the received update data. Additionally, the memory can be used to store system operational parameters of the gateway device, such as communication chip configuration parameters. Optionally, the memory can be disposed inside the microcontroller. Optionally, the memory is a flash memory. Optionally, the memory includes at least one memory device coupled with the microcontroller and selected from a NOR flash through a Serial Peripheral Interface (SPI) or Parallel Bus Interface (PBI), a Secure Digital (SD) card and NAND flash through Secure Digital Input Output (SDIO) interface.

In an embodiment, the microcontroller is configured to store the updated data of electronic tags received by the network modem into the memory. In order to guarantee the integrity of the received update data, the microcontroller can be set a relatively high priority for an operation of using the memory to store the updated data. For example, when the gateway device receives a wake-up command from the server via the network modem, the communication chip may be just performing an updating work for electronic tags. In this case, the microcontroller is configured to send a stop-update command to halt the updating work of the communication chip and allow the memory to be ready to receive the updated data and completely store the updated data to the assigned storage spaces.

In another embodiment, the microcontroller is configured to split the updated data for multiple electronic tags to multiple individual updated data and control the communication chip to respectively transmit the multiple individual updated data to respective multiple electronic tags.

When the gateway device receives the updated data for multiple electronic tags, the updated data can be firstly saved in a message queue cache. Then, the data saved in the message queue cache can be stored one by one into the memory. Thus, a split operation of the updated data for multiple electronic tags received by the gateway device in one time is completed so that each split updated data can be transmitted one by one to respective electronic tags. During the operation of transmitting updated data to electronic tags, the communication chip may be read the updated data one by one from the memory and transmit each of them to a corresponding electronic tag.

Figure 2:
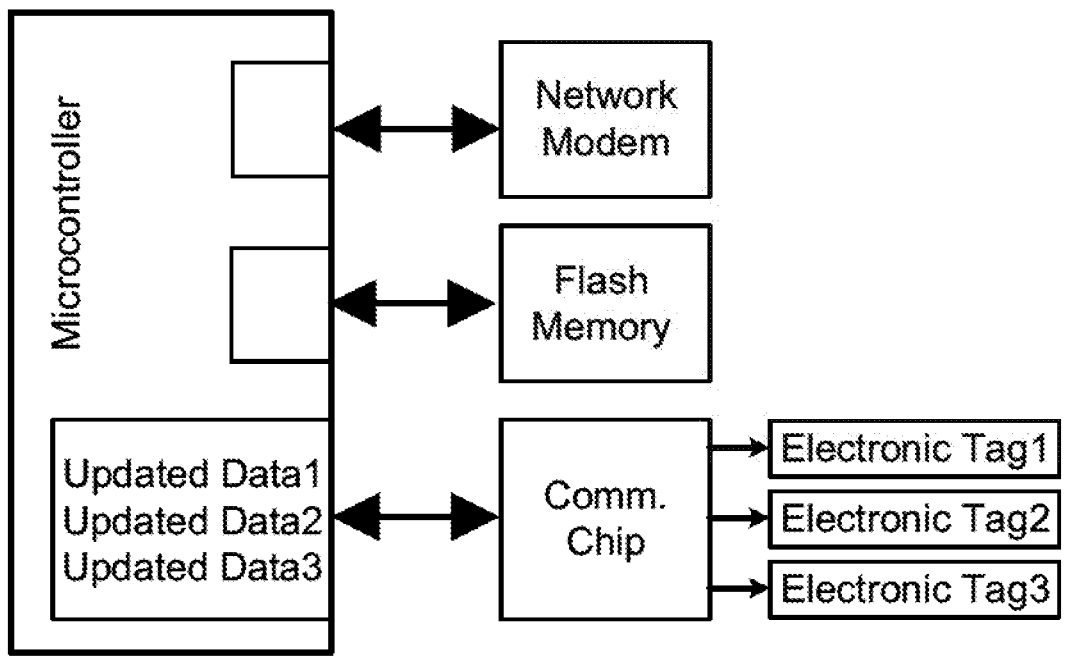
FIG. 2 is a schematic diagram of a Communication chip updating data in an electronic tag according to an embodiment of the present disclosure.

FIG. 2 is a schematic diagram of a communication chip updating data in an electronic tag according to an embodiment of the present disclosure. Referring to FIG. 2, the communication chip is configured to firstly read an updated data1 from the memory. The updated data1 is updated data corresponding to an electronic tag1. Based on the correspondence relationship, the communication chip transmits the updated data1 to the electronic tag1. After completing the data update work for the electronic tag1, the communication chip may once again read a next updated data from the memory, for example, updated data2. The communication chip then performs the same data updating work on the electronic tag2 as that for the electronic tag1. The communication chip repeats the operation until all updated data stored in the memory are transmitted to corresponding electronic tags.

Additionally, in case one updated data corresponds to multiple electronic tags, for example, the updated data1 in the memory corresponds to both the electronic tag1 and the electronic tag3, the communication chip can read the updated data1 from the memory, and transmit the updated data1 to both the electronic tag1 and the electronic tag3 so that both the electronic tag1 and the electronic tag3 are updated with the updated data1. Both the electronic tag1 and the electronic tag3 can display the merchandise information contained in the updated data1. Of course, the updated data for the electronic tag includes all kinds of information other than the commodity price, such as price before the update or after the update, discount rate based on the updated price, detail descriptions such as shelf life, origin, source of goods, preferential information, etc.

In another embodiment, the communication chip is also configured to receive update feedback information and battery power level information of each electronic tag out of the multiple electronic tags. The communication chip is configured to transfer the update feedback information and battery power level information of each electronic tag out of the multiple electronic tags to the microcontroller.

Figure 3:
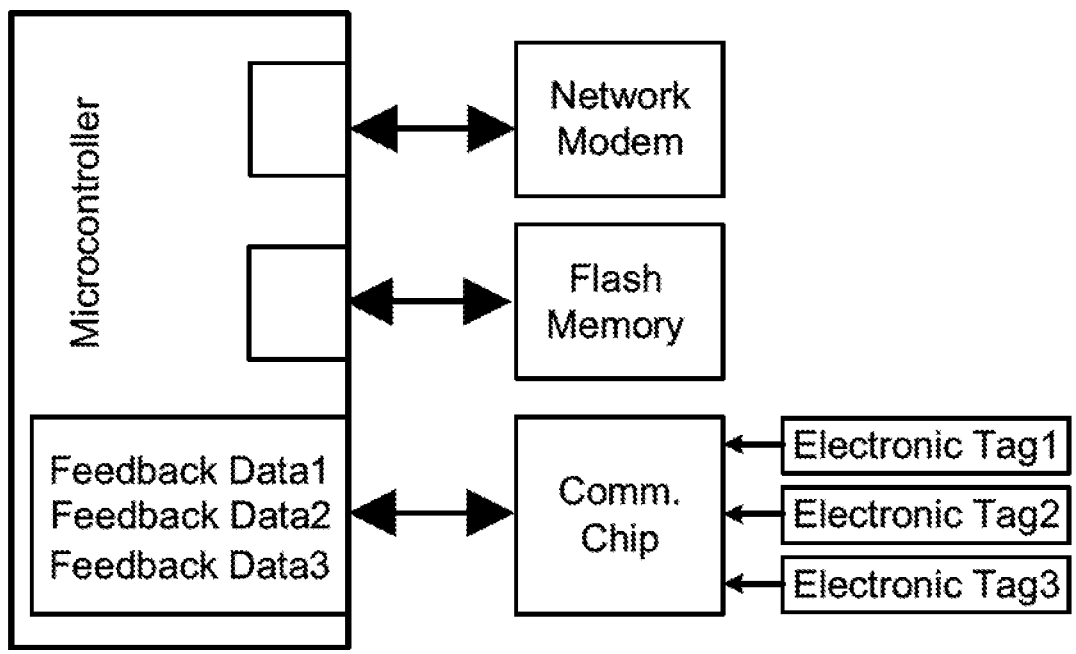
FIG. 3 is a schematic diagram of a gateway device for updating data in an electronic tag via a Communication chip according to an embodiment of the present disclosure.

FIG. 3 is a schematic diagram of a gateway device for updating data in an electronic tag via a communication chip according to an embodiment of the present disclosure. After the communication chip finishes its data updating work for one electronic tag, it can receive an update feedback information and battery power level information of the corresponding one electronic tag and transmit the update feedback information and battery power level information to the microcontroller. Referring to FIG. 3, after the communication chip finishes its data updating work for electronic tag1, the electronic tag1 is able to send a feedback data1 (including an update completion information and power level of itself) to the communication chip. The communication chip then can transmit such feedback data1 to the microcontroller. By determining the update feedback information contained in the feedback data1, the microcontroller controls the communication chip to execute data updating work for electronic tag2. After finishing its data updating work for the electronic tag2, the communication chip can also receive and transmit a feedback data2 from the electronic tag2 to the microcontroller.

Optionally, the battery power level information may indicate a specific power level of the electronic tag, such as 80% remaining power. Optionally, the battery power level information may indicate battery power level status, such power sufficient, power low, etc. The microcontroller can perform certain operations based on the battery power level information. For example, when the battery power level of an electronic tag is too low, the microcontroller can upload specific location information of the electronic tag to the server so that a charging operation can be done in time and accurately for this electronic tag. Of course, the feedback data may contain other information other than the update feedback information and battery power level information. For example, the feedback data can include display malfunction information of the electronic tag, etc.

In an embodiment, the microcontroller also is configured to save the update feedback information and/or battery power level information of the multiple electronic tags that have been updated to the memory. The microcontroller is to determine an update completion information for multiple electronic tags based on the update feedback information for the multiple electronic tags. For example, after receiving updated data for multiple electronic tags, the microcontroller split the updated data to multiple individual updated data and save each individual updated data one by one into the memory. At a condition that the quantity of update feedback information received from electronic tags is determined to be equal to the quantity of individual updated data split by the microcontroller and saved in the memory, the microcontroller can determine that the operation of this round of data updating work is finished. Then based on the determination, an update completion information can be generated by the microcontroller.

In another embodiment, the microcontroller is configured to monitor network connection status based on the network modem to determine if at least one of the update feedback information, the battery power level information, and the update completion information will be uploaded to the server.

Figure 4:
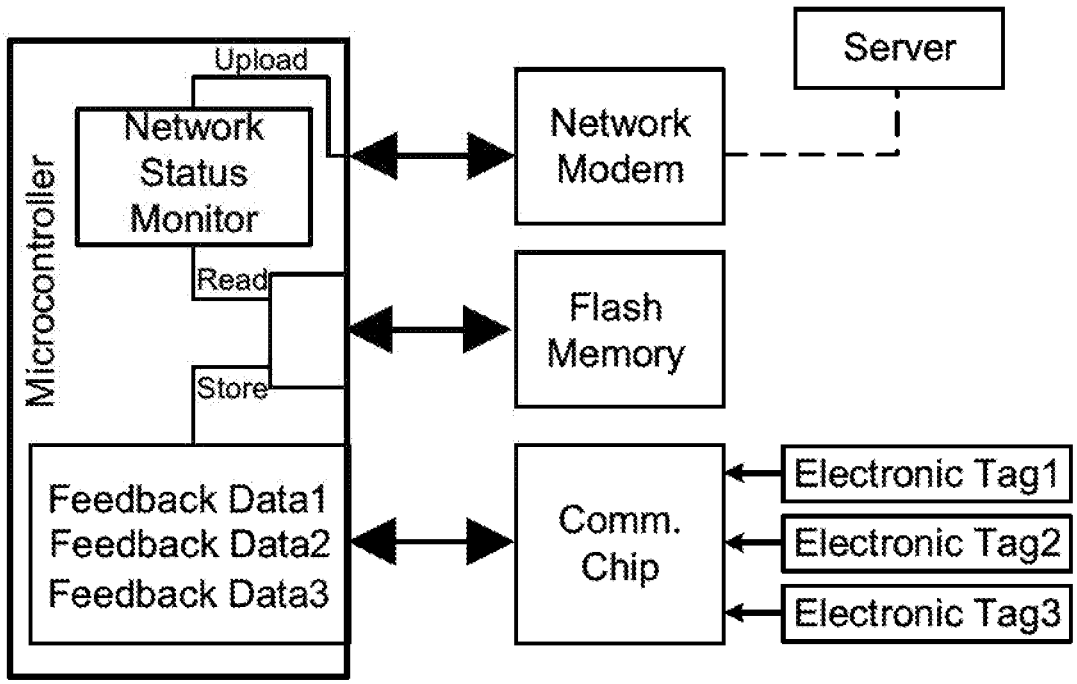
FIG. 4 is a schematic diagram of a microcontroller controlling a network modem to upload data according to an embodiment of the present disclosure.

FIG. 4 is a schematic diagram of a microcontroller controlling a network modem to upload data according to an embodiment of the present disclosure. Referring to FIG. 4, during a data updating work performed by the communication chip, the microcontroller also can control the network modem to monitor at scheduled times a network connection status between the gateway device and the server. After the microcontroller receives feedback data1 from the electronic tag1, the feedback data1 can be saved in the memory. If the network connection currently monitored is normal, the feedback data1 then is uploaded to the server to notify the server that the data updating work for this electronic tag is completed.

When the network modem monitors the network connection status and finds it has a failure, for example, no data transmission can be done with the server, the microcontroller is configured to control the network modem to be ready for upload at least one saved information selected from the update feedback information, the battery power level information, and the update completion information back to the server when the network connection recovers from the failure.

In an example, after the microcontroller receives feedback data2 from the electronic tag2, it saves the feedback data2 to the memory. If at the time the network connection failure is monitored by the network modem, the microcontroller controls the network modem to halt uploading the feedback data2 and control the communication chip to perform data updating work for the electronic tag3. After the network connection recovery back to normal is monitored by the network modem, the microcontroller controls the network modem to continue uploading all feedback data that are saved in the memory, including the feedback data2.

In an embodiment, for each electronic tag, the microcontroller is also configured to record the time-span for the communication chip to transmit the updated data of the electronic tag to the corresponding electronic tag. If the microcontroller does not receive update feedback information from the electronic tag within a pre-scheduled time interval, the microcontroller controls the communication chip to re-transmit the updated data of the electronic tag to the corresponding electronic tag.

Normally, reliable communication distance for communication is relatively small. Sometime, transmission of the updated data of an electronic tag through the communication chip may fail. In order to guarantee operation stability and data integrity of performing data updating for the electronic tag, the microcontroller is configured to monitor if the update feedback information is received within a pre-determined time interval from the electronic tag that has been transmitted the corresponding updated data. For example, as shown in FIG. 3, the microcontroller can control the communication chip to transmit an updated data3 to the electronic tag3 and record a transmission time span t1. If the electronic tag3 fails to finish the data updating due to a network connection failure, it does not upload a feedback data3 to the microcontroller. After a predetermined time T, the microcontroller determines that it still do not receive feedback data3 and controls the communication chip to transmit the updated data3 to the electronic tag3 again in another attempt of performing the data updating work to guarantee the data updating stability. Additionally, if the microcontroller still does not receive the feedback data3 after a pre-determined number (for example, 3) of re-transmission, the microcontroller can save an update failure information to the memory. The microcontroller can upload this update failure information for the electronic tag3 via the network modem.

In yet another embodiment, the network modem is configured to receive one or more commands from the server for controlling operation of the gateway device. The commands include at least one of a wake-up command, an update command, and a stop-update command. The server can use the one or more commands to control a progress of operating the gateway device for the data updating work.

In another embodiment, the wake-up command is to instruct the gateway device to assign storage spaces for the updated data of electronic tags. In general, before the server sends updated data to the gateway device, the gateway device may perform an operation not related to a reception of updated data. For example, the gateway device may perform a data updating operation for the updated data sent last time from the server or control the network modem to monitor network connection status. In order to guarantee integrity of the updated data being received in real time, the server can use the wake-up command to notify the gateway device that it is about to send the updated data so that the gateway device can be ready to receive the updated data. For example, the microcontroller can control stopping other operations that are on going and assigning storage spaces for the updated data to be received.

In yet another embodiment, the update command is to instruct the gateway device to start transmit the updated data saved in the memory to one or more corresponding electronic tags. After the gateway device receives the updated data and splits the updated data and respectively saves the split updated data to the memory, the gateway device can directly perform operation to update data in the one or more electronic tags. Optionally, the gateway device may not perform the data updating work temporarily, instead, wait an update command from the server. After the gateway device receives the update command via the network modem from the server, the microcontroller of the gateway device then starts to control the communication chip to transmit the updated data to the corresponding electronic tag. Based on the update command, the server can achieve a real-time control to the data updating of the electronic tag. For example, the server can send the updated data ahead of time. The gateway device receives the updated data and save the updated data to the memory. The server then waits until a predetermined updating time is arrived and starts to send the update command to the gateway device to allow the latter to execute a corresponding data updating work based on the update command.

In an example, the server firstly sends updated dataA (e.g., information for instructing the electronic tag to display a standard price), then sends updated dataB (e.g., information for instructing the electronic tag to display a sales price). Both the updated data A and the updated data B are saved in the memory. Then, the server sends an update commandA corresponding to the updated dataA to allow the electronic tag to display information contained in the updated dataA through a data updating operation. When a predetermined sales time is reached, the server sends an update commandB corresponding to the updated dataB for quickly updating data in the electronic tag. When the sales time ends, the server further sends an update commandA corresponding to the updated data so that the electronic tag can display the standard price again.

In an embodiment, the stop-update command is to instruct the gateway device to stop transmitting the updated data saved in the memory to the corresponding electronic tag. For example, after the server sends updated data to the gateway device, error information in the updated data is detected. In this case, the server can send a stop-update command so that the gateway device can be prevented from transmitting the error information to the electronic tag.

In another embodiment, the network modem and the communication chip are respectively connected to the microcontroller via a universal asynchronous receiver-transmitter (UART). The microcontroller is driven by a real-time multi-task operation system. Optionally, the operation system is adopted with a μC/OS operation system, which is a much simpler operation system comparing to typical Linux operation system with reduced power consumption and improved real-time operation capability. Optionally, the network modem is connected to the server wirelessly or through a wired connection to receive all commands and updated data from the server. Optionally, the network connection also allows the network modem to upload data including update feedback information. Optionally, the wireless connection is through a Wi-Fi network. Optionally, the wired connection is through an Ethernet network. Optionally, the network modem is configured to monitor network connection status the gateway device at scheduled times. Optionally, the communication chip is provided as a system-on-chip device that adopts a low-energy communication protocol and is capable of achieving data transmission between the gateway device and multiple electronic tags. The low-energy communication protocol is more open to allow directly communication with smart phone and other Bluetooth devices and is also more secure by adopting AES encryption. Further, the low-energy communication consumes less power and has advantage of strong anti-interference ability (with frequency hopping ability).

Figure 5:
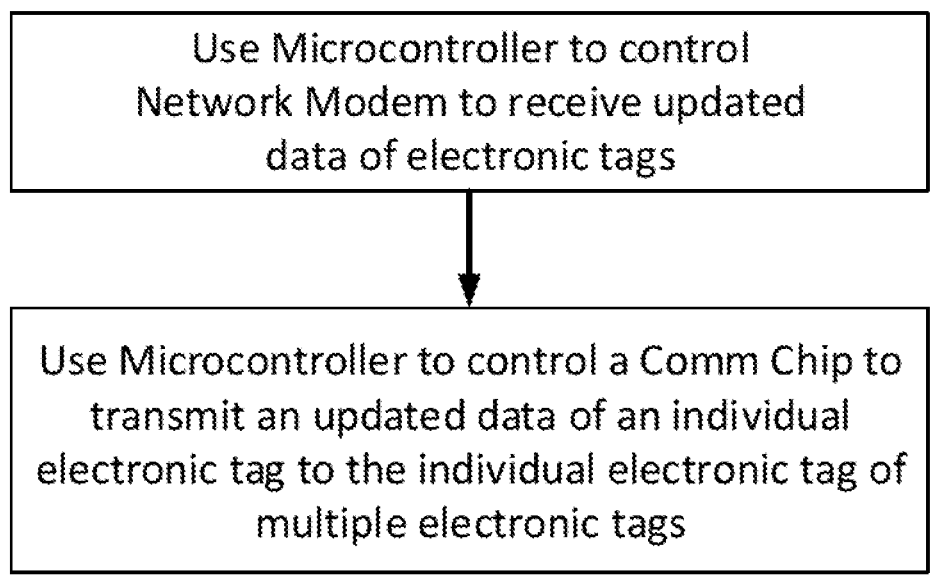
FIG. 5 is a flow chart illustrating a method for updating data in electronic tags according to some embodiments of the present disclosure.

In another aspect, the present disclosure provides a method of managing multiple electronic tags. FIG. 5 is a flow chart illustrating a method for updating data in electronic tags according to some embodiments of the present disclosure. Firstly, the method includes using a microcontroller to control a network modem to receive updated data of electronic tags. The updated data of electronic tags include individual updated data for each individual electronic tag of multiple electronic tags. The step of the method allows the updated data for all the multiple electronic tags to be received completely in one time.

Additionally, the method includes using the microcontroller to control a communication chip to transmit each updated data to each corresponding electronic tag of the multiple electronic tags. Through the step, all updated data of electronic tags received can be transmitted one by one to a corresponding electronic tag to achieve data updating for each electronic tag.

The method further includes using the microcontroller to save the updated data of electronic tags received by the network modem into a memory. After receiving the updated data of electronic tags, the microcontroller can split the updated data to multiple individual updated data and save the individual updated data one by one into the memory. The method also includes using the communication chip to respectively transmit the split individual updated data to a corresponding electronic tag.

Once the electronic tag receives the updated data and finishes data updating, the electronic tag is able to upload feedback data. The method further includes using the communication chip to receive update feedback information and/or battery power level information from each of the multiple electronic tags and transmit the update feedback information and/or battery power level information associated with the multiple electronic tags to the microcontroller. Then, the method includes using the microcontroller to save the update feedback information and/or battery power level information associated with the multiple electronic tags into the memory. Additionally, the method includes using the microcontroller to determine an update completion information based on the update feedback information and/or battery power level information associated with the multiple electronic tags. Such update completion information can be used to notify the server that all updated data sent by the server in current round have been updated to corresponding multiple electronic tags.

Furthermore, the method includes using the microcontroller to monitor a network connection status based on the network modem and determine to upload at least one of the update feedback information, the battery power level information, and the update completion information saved in the memory to the server. When a network connection failure is monitored by the network modem, the microcontroller can control the network modem to halt the uploading of the at least one of the update feedback information, the battery power level information, and the update completion information saved in the memory to the server until the network connection is recovered. Thus, the updating efficiency of the electronic tag can be enhanced to avoid affection of network connection failure to the data updating of the electronic tags.

For each electronic tag, the method includes using the microcontroller to record a time-span for the communication chip to transmit the updated data of the electronic tag to the corresponding electronic tag. Under a condition that the microcontroller does not receive an update feedback information within a predetermined time interval, the microcontroller controls the communication chip to retransmit the updated data to the corresponding electronic tag.

The method also includes using the network modem to receive one or more commands for controlling operations of a gateway device for managing data updating of the multiple electronic tags. For example, the one or more commands includes at least one of a wake-up command, an update command, and a stop-update command. The wake-up command is used to instruct the gateway device to assign storage spaces for the updated data to be sent from the server. The update command is used to instruct the gateway device to start transmitting the updated data saved in the memory to the corresponding electronic tag. The stop-update command is used to instruct the gateway device to stop transmitting the updated data saved in the memory to the corresponding electronic tag. Based on the one or more commands, the server can control a progress of the data updating operation performed by the gateway device.

By means of the method described herein for managing multiple electronic tags, the update of multiple electronic tags can be quickly executed. In an embodiment, the network m modem can be used to receive the updated data for all electronic tags in one time to guarantee integrity of reception of the updated data. Then, the communication chip can be used to transmit each updated data one by one to a corresponding electronic tag of the multiple electronic tags, reducing data updating time for the multiple electronic tags overall. Additionally, if a network connection is failed during the data updating process of the electronic tag, the communication chip can still be used to continue data updating to the electronic tags and to save feedback data from the electronic tags to the memory (associated with the microcontroller). Once the network connection is monitored to become normal again, the network modem can be reused for uploading the feedback data so that efficiency of the data updating process is improved.

In some embodiments, the gateway device and methods described herein can be applied to manage electronic racking system including multiple electronic tags. The gateway device described herein includes a network modem, a communication chip, and a microcontroller. The network modem can be a Wi-Fi module achieving a self-defined communication protocol between a server and the gateway device. The Wi-Fi module can be used to receive updated data for electronic tags and one or more commands from the server and also be used to upload update feedback information of the electronic tags. Additionally, the Wi-Fi module can include two work modes. In access point mode, the Wi-Fi module is served as a Transmission Control protocol (TCP) server. In an example, once a smart phone or a PDA device run at the TCP customer terminal is connected with the gateway device, it can achieve gateway working parameter configuration. For example, all parameters include server IP address, network connection status monitor time interval, etc. The PDA device can be a bar-code scanner, a RFID reader, a POS machine, etc. The network modem can also be configured to connect the server via a wired connection such as a Wiznet W5500 of a full-hardware TCP/IP embedded Ethernet Control module, or a full hardware TCP/IP protocol stack chip, or other embedded system chips having functions similar to the Wi-Fi module. The communication chip can be configured to be a BLE module, adopting low-energy communication technology with high security, low power-consumption, strong anti-interference capability. Optionally, the communication chip is provided as a system-on-chip like one provided by Texas Instrument running Operating System Abstraction Layer (OSCL) operation system and compatible with BLE4.0 protocol. Optionally, the communication chip is used as a host device in the BLE protocol and used to transmit updated data to the electronic tag, which is served as a slave device, and to receive update feedback information and battery power level information from the electronic tag and to transmit the information to the microcontroller. The microcontroller is served as a host unit of the gateway device and can be configured as a micro controller unit (MCU), or a digital signal processor (DSP), a field programmable gate array (FPGA), a program-specific integrated circuit (ASIC), a program-specific standard product (ASSP), and a complex programmable logic device (CPLD), etc. The host unit can be nm under a µC/OS operation system to handle multiple tasks and can control the operation of the Wi-Fi module and the BLE module as coprocessors to achieve communication protocols between the server and multiple electronic tags. The microcontroller may be connected with the Wi-Fi module (network modem) and the BLE module (Communication chip) through a Universal Asynchronous Receiver/Transmitter (UART) interface.

In some other embodiments, the gateway device also includes a memory used for real-time storage of a large quantity of updated data of electronic tags sent from the server and update feedback information from the electronic tags, as well as storage of system working parameters of the gateway device. The memory can be connected with the microcontroller via a Serial Peripheral Interface (SPI).

Figure 6:
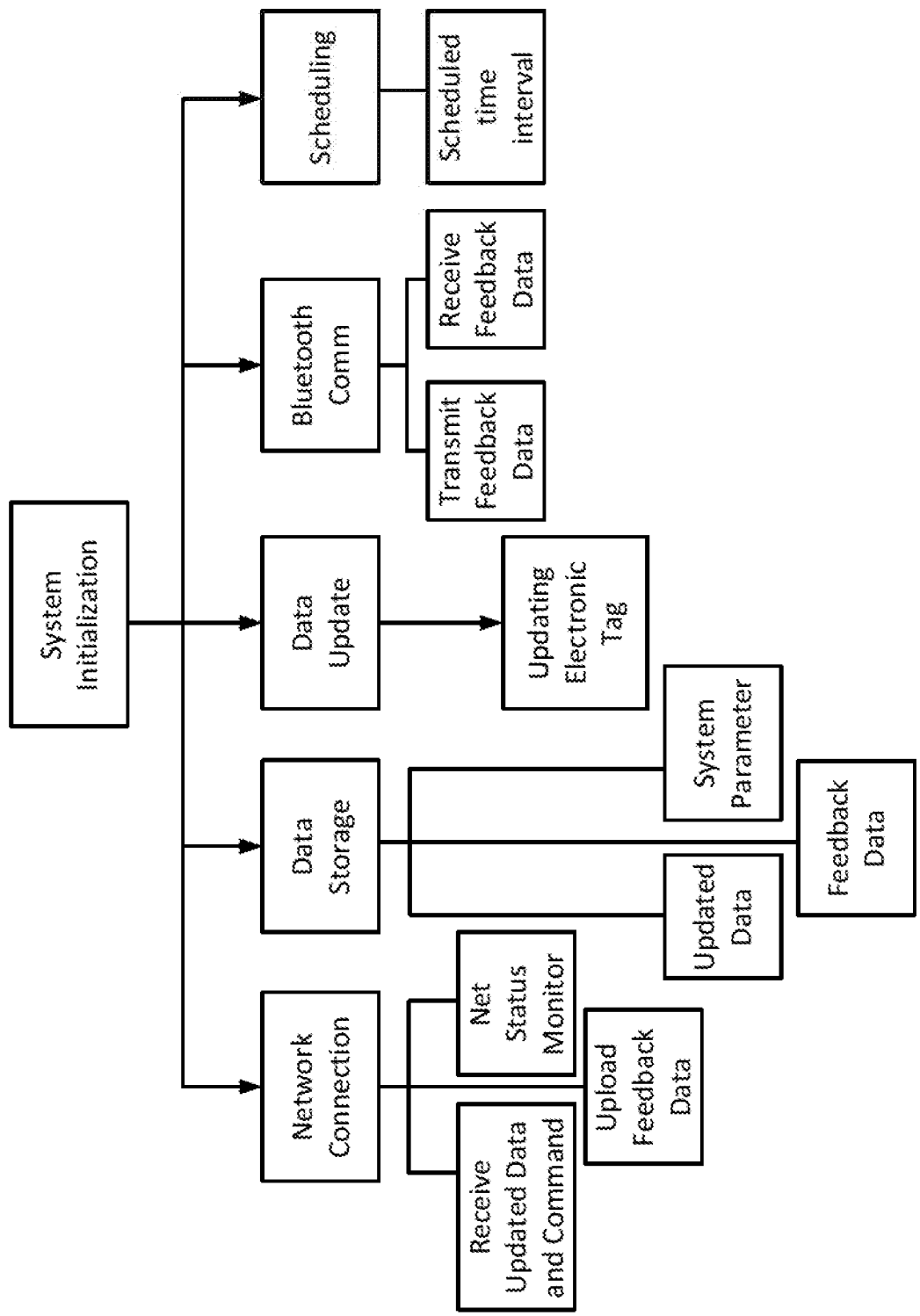
FIG. 6 is a schematic diagram of the gateway device configured to manage multitasks associated with update of electronic tags according to some embodiments of the present disclosure.
Figure 7:
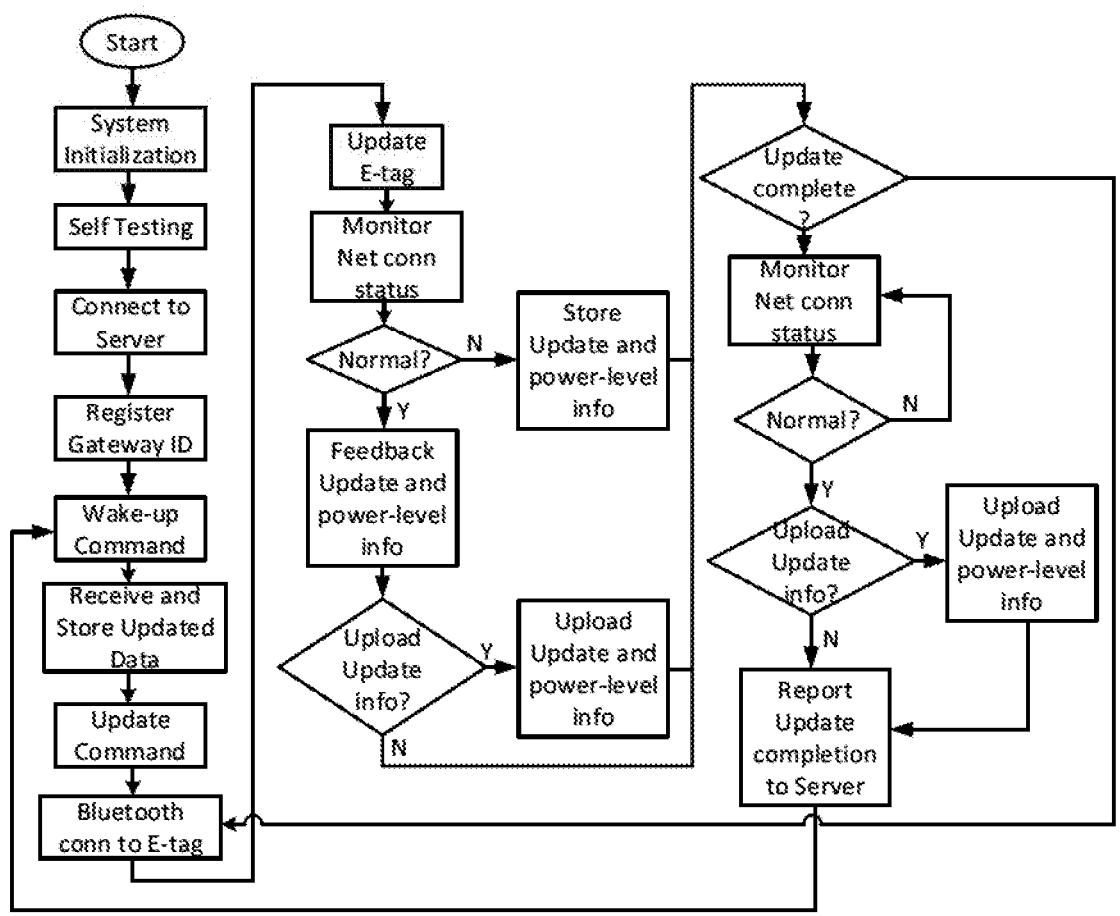
FIG. 7 is a flow chart illustrating a method for managing multiple electronic tags according to an embodiment of the present disclosure.

Using the gateway device, the data updating of multiple electronic tags in the electronic racking system can be achieved. Specifically, FIG. 6 is a schematic diagram of the gateway device configured to manage multitasks associated with update of electronic tags according to some embodiments of the present disclosure. FIG. 7 is a flow chart illustrating a method for managing multiple electronic tags according to an embodiment of the present disclosure. Both FIG. 6 and FIG. 7 are referred below to illustrate a method of achieving data updating of multiple electronic tags.

The microcontroller (referred as MCU hereafter) run with a µC/OS real-time operation system can divide a process of updating data for electronic tag to multiple tasks achieving different functions. As shown in FIG. 6, the tasks may include a network connection task, a data storage task, a data update task, a communication task, and scheduling task. Additionally, during an initial application period of the gateway device, a system initialization process is also included.

During the system initialization process, it firstly can execute MCU Peripheral (including multiple UART connections, SPI interface) and Interrupt initialization. Then, it also executes initialization of each circuit functional units, such as the Wi-Fi module, W5500 and BLE module. During the Wi-Fi module initialization, it can include configuration and connection access point, Dynamic Host Configuration Protocol (DHCP) obtain network IP address, configuration of two working modes, connections to server's IP address and terminal, etc. If the Wi-Fi module initialization succeeds and can connect to a remote server, the gateway device can preferentially implement the network communication function by using Wi-Fi mode. Or, the gateway device can execute W5500 initialization and connect to a remote server in a network communication connection utilizing a local area network (LAN) mode. When the gateway device successfully connects the server, the gateway device can send a register information and wait for feedback from the server.

The BLE module initialization includes using the MCU to send a Central command via UART to set its Bluetooth mode. If the configuration is successful, the Central mode feedback can be received, which also completes a self-test of the BLE module. After a completion of initialization processes for all hardware mentioned above, it can perform multi-task creation and initializations of various data structures (Semaphore, message queue).

Referring to FIG. 6, the network connection task includes functions for receiving updated data and commands, uploading feedback data and monitoring network connection status. The network connection task is mainly to process information exchange between the Wi-Fi module and the server. The commands for working with the task include a wake-up command, a start-update command, and a stop-update command. The wake-up command instructs the gateway device to be ready for receiving updated data of electronic tag and feedback such a command to the server. The start-update command activates an update task and initializes relevant data variables. The stop-update command stops the update task and initializes relevant data variables. When the network connection task works on monitoring network status, the task can query the TCP connection between the Wi-Fi module and the server. If the network connection is disconnected, the gateway device needs to reconnect with the server. When the network connection task works on uploading feedback data to the server, the task can instruct the network modem (Wi-Fi module) to upload the feedback data in database.

Referring to FIG. 6, the data storage task can store in real time a large number of updated data of electronic tags sent from the server and updated results of the electronic tags as well as save system parameters. When there is no data update work, the task is in a wait-for-blocking state and is not activated until a (new) updated data of an electronic tag is received from the server. The server usually sends the updated data of electronic tags in a manner of burst with large quantities. In order to guarantee integrity and completeness of the updated data of electronic tags received and saved by the gateway device, it is preferred to use a real-time storage manner with strong real-time interrupt+message queue data structure+the highest priority.

When the UART connected to the network modem receives an updated data of electronic tag in an interrupt manner, it may first save the updated data to a message queue cache, then send a semaphore to the data storage task to activate the task. Immediately, it starts to execute the task (which has a highest priority) to store the updated data of electronic tags in the message queue one by one from the cache to an external memory. The transmission rate of the updated data of electronic tags and the data write rate of the memory are taken into consideration. Since the Wi-Fi module connection is TCP (The protocol supports rate auto-negotiation mechanism for both parties), the port rate is 115200 bps and far lower than the data write rate of the memory at 18 Mbps. Therefore, it is guaranteed that the updated data of electronic tags received by the gateway device can be completely written into the memory through the SPI interface substantially in real time. Additionally, the memory just enters an erase operation in written space as the server sends a wake-up command (before sending any updated data of electronic tags). During the process of storing the updated data of electronic tags, the data storage task only executes write operation but not the time-consuming erase operation, ensuring completeness and stability of the data transmission process.

Referring to FIG. 6, the data update task is activated to execute after receiving a start-update command from the server. The task can retrieve the updated data of electronic tags one by one from specific space of an external memory. Then the task is transferred to a communication task for sending via a Bluetooth BLE protocol to the electronic tags. After the communication task is executed, the task is further to deliver update feedback information and battery power level information to the data update task, through which the update feedback information and battery power level information are uploaded to the server. If the network connection fails during the data update process, the data update task will continue to update the electronic tags. At the same time, the update feedback information and battery power level information will be saved in the memory. Once the network connection is monitored to become normal, the update feedback information and battery power level information will be uploaded to the server in time.

Referring to FIG. 6, the communication task can control a working state of a BLE module (i.e., the communication chip), transmit the updated data of electronic tags to corresponding electronic tags, receive update feedback information and battery power level information from the electronic tags, and deliver for the data update task to process. As mentioned earlier, once the communication task is activated, it may sequentially send commands to the BLE module through UART, where the commands includes those for establishing connection, sending updated data of electronic tags, and disconnecting connection, etc. Since communication distance is relatively short, the communication task adopts a fail-and-retransmit method to ensure reliability of the transmission. In a condition of unable to receive the update feedback information from an electronic tag within a predetermined time interval, the task can retransmit the updated data of the electronic tag to the electronic tag.

Further, the scheduling task is used to generate multiple scheduled messages for activating any one task mentioned above, such as Wi-Fi connection status monitoring, BLE scanning, etc.

FIG. 7 shows a work flow for illustrating a method of using a gateway device to manage multiple tasks associated with data/information exchange between a host server and multiple slave devices. In an embodiment, the method shows that the gateway device is turned on at start for managing data update for multiple electronic tags. Firstly, the method includes a step of starting system initialization. Referring to FIG. 7, this step includes completing hardware units initialization for Wi-Fi module, network connection through LAN Ethernet to a server, BLE-based Bluetooth chip contained in the gateway device. Optionally, this step also is followed by self-testing of these hardware units, initializing network connection, and registering the gateway device's network ID. Once the gateway device obtains a register-success feedback information from the server, a microcontroller in the gateway device can create multiple tasks and manage the operations of these tasks.

Initially, the system only runs a network connection task and a scheduling task while making other tasks in hibernation, e.g., making the gateway device in a state waiting for a wake-up command. After the step of receiving the wake-up command from the server, the network connection task then is switched to a data update task to make the gateway device being activated to a mode for performing data updating of electronic tags. Optionally, the microcontroller in the gateway device, in response to the wake-up command, is operated to erase relevant storage spaces in a memory and send a feedback information to the server.

Referring to FIG. 7, the server, after receiving feedback information that indicates the gateway device is ready and the network connection is normal, starts to send a large quantity of updated data of electronic tags. The gateway device receives the large quantity of updated data of electronic tags via the network modem (e.g., Wi-Fi module), and adopt a serial port real-time interrupt and message queue to cache the updated data. At the same time, a data storage task that was in hibernation is activated now and saves one by one of the updated data of respective electronic tags into an external memory in substantially real time. After sending all updated data for multiple electronic tags, the server sends a start-update command. Now, a data update task and a communication task are activated. The gateway device starts to retrieve the updated data one by one from the external memory, then to connect through a Bluetooth co-processor (in a Central mode) with multiple electronic tags and to transmit the updated data to the corresponding multiple electronic tags. At the same time, the gateway device uploads an update feedback information and battery power level information from each electronic tag that just finishes the data updating to the server. A network connection task can be executed to monitor network connection status at scheduled times. Under a normal network connection, the gateway device just uploads the update feedback information and battery power level information. If network connection is not normal, the gateway device just saves the update feedback information and battery power level information into the memory.

After performing an operation of updating data for an electronic tag, the gateway device can determine if all electronic tags finish the corresponding data updating. If it is determined that at least one updated data remained in the memory still is not transmitted to a corresponding electronic tag, the gateway device continue to execute the data update task for this updated data to be transmitted to the corresponding electronic tag. If it is determined that all electronic tags have been updated, the gateway device uploads the update feedback information and batter power level information for all electronic tags based on the network connection status. Additionally, the gateway device will upload an update completion information to the server. At this time, the gateway device once again enters the wait-for-wake-up status. In other words, now the gateway device only executes the network connection task and the scheduling task while other tasks are in hibernation.

The present disclosure provides a gateway device and methods for managing multiple electronic tags. The gateway device can execute a data updating operation for multiple electronic tags quickly and stably. The gateway device can fully receive updated data for all electronic tags in one time sent from a server to ensure data integrity. The gateway uses a communication chip to transmit the updated data one by one to each electronic tag of the multiple electronic tags in an electronic racking system, saving updating time for these electronic tags. Additionally, if there is a network connection failure during the data updating operation, the communication chip is still able to continue updating data with electronic tags and save feedback data thereof and wait for uploading the feedback data once network connection is recovered, enhancing efficiency of data updating for the electronic tags.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A gateway device for managing multiple electronic tags comprising:
    a network modem configured to receive updated data for multiple electronic tags;
    a communication chip configured to transmit the updated data for each individual electronic tag one by one to a corresponding individual electronic tag of the multiple electronic tags; and
    a microcontroller coupled with the network modem and the communication chip to control receiving the updated data for the multiple electronic tags from the network modem and transmitting the updated data for each individual electronic tag of the multiple electronic tags respectively to each corresponding one of the multiple electronic tags and receiving update feedback information from each electronic tag that has been update;
    wherein the microcontroller is configured to split the updated data to multiple individual updated data respectively for individual electronic tag of multiple electronics tags and to control the communication chip to transmit each of the multiple individual updated data to the corresponding individual electronic tag through a wireless communication protocol selected from a universal asynchronous receiver-transmitter (UART), a Serial Peripheral Interface (SPI), I2C interface, and Universal Serial Bus (USB);
    the communication chip is configured to receive the update feedback information and/or battery power level information from the individual electronic tag and to transmit the update feedback information and/or the battery power level information to the microcontroller through a wireless communication protocol selected from a universal asynchronous receiver-transmitter (UART), a Serial Peripheral Interface (SPI), I2C interface, and Universal Serial Bus (USB); and
    the microcontroller is configured to record a time interval for the communication chip to transmit a first updated data for a first electronic tag of the multiple electronic tags to the first electronic tag, and to control the communication chip to re-transmit the first updated data for the first electronic tag to the first electronic tag if the update feedback information from the first electronic tag is not transmitted by the communication chip to the microcontroller within a pre-scheduled time interval.

2. The gateway device of claim 1 further comprising:
    a flash memory coupled to the microcontroller to store the updated data for the multiple electronic tags and the update feedback information from each electronic tag that has been updated, wherein the flash memory comprises one memory device controlled by the microcontroller, wherein the one memory device is selected from a NOR flash through a Serial Peripheral Interface (SPI) or Parallel Bus Interface (PBI), a Secure Digital (SD) card and NAND flash through Secure Digital Input Output (SDIO) interface.

3. The gateway device of claim 2, wherein the network modem is configured to receive instructions from a server for operating the gateway device, the instructions including at least one of a wake-up command, an update command, and a stop-update command;
    wherein the wake-up command is for instructing the gateway device to assign storage spaces in the flash memory to store the updated data for the electronic tag;
    wherein the update command is for instructing the gateway device to begin transmitting the updated data stored in the flash memory to the electronic tag;
    wherein the stop-update command is for instructing the gateway device to stop transmitting the updated data stored in the flash memory to the electronic tag.

4. The gateway device of claim 1, wherein the microcontroller is configured to process the update feedback information and/or the battery power level information from the multiple electronic tags that have been updated and determine update completion information for the individual electronic tag based on the update feedback information from the multiple electronic tags.

5. The gateway device of claim 4, wherein the microcontroller is configured to determine at least one of the update feedback information, the battery power level information, and the update completion information stored in a flash memory to be uploaded through the network modem to a server based on network connection status monitored by the network modem, and to control the network modem to upload at least one of the update feedback information, the battery power level information, and the update completion information stored in the flash memory once network connection recovers from any network connection failure.

6. The gateway device of claim 1, wherein the network modem is connected to a server wirelessly via a Wi-Fi network or through a wired connection via an Ethernet network.

7. The gateway device of claim 1, wherein the communication chip comprises a system-on-chip configured to communicate with multiple electronic tags in s personal area network via one communication protocol selected from Bluetooth Low Energy (BLE) protocol, 2.4 GHz private protocol, and Sub-GHz protocol.

8. The gateway device of claim 1, wherein the microcontroller comprises a μC/OS operation system configured to perform multiple tasks in real time.

9. A method for managing multiple electronic tags comprising:
receiving updated data for multiple electronic tags;
transmitting one of the updated data for an individual electronic tag to a corresponding individual electronic tag;
using a microcontroller to control receiving the updated data via a network modem and control transmitting individual updated data for an individual electronic tag one by one via a communication chip to the corresponding individual electronic tag;
splitting the updated data for the multiple electronic tags into multiple individual updated data, and
transmitting each of the multiple individual updated data to corresponding one of the multiple individual electronic tags wirelessly by the communication chip using a Bluetooth protocol;
receiving update feedback information and/or battery power level information from each of the multiple electronic tags wirelessly by the communication chip using the Bluetooth protocol;
transmitting the update feedback information and/or the battery power level information from the communication chip via a universal asynchronous receiver-transmitter (UART) to the microcontroller;
storing the update feedback information and/or the battery power level information to a flash memory;
determining update completion information of the electronic tag based on the update feedback information from the electronic tag;
monitoring network connection status including connection failure and connection recovery using the network modem;
determining at least one of the update feedback information, the battery power level information, and the update completion information stored in the flash memory to be uploaded through the network modem to a server based on the network connection status, and controlling the network modem to upload at least one of the update feedback information, the battery power level information, and the update completion information stored in the flash memory through the network modem to the server once network connection recovers from a failure;
transmitting each of the multiple individual updated data comprises recording a time span for the communication chip to transmit each of the multiple individual updated data to corresponding one of the multiple electronic tags, and controlling the communication chip to re-transmit the individual updated data to the corresponding one of the multiple electronic tags if an update feedback information from the corresponding one of the multiple electronic tags is not received by the microcontroller within a pre-scheduled time interval; and
receiving multiple commands from the server via the network modem, the multiple commands including at least one of a wake-up command, an update command, and a stop-update command;
wherein the wake-up command is to assign storage regions in the flash memory for the updated data of the electronic tag received by the network modem;
wherein the update command is to begin using the communication chip to transmit the updated data stored in the flash memory to the electronic tag;
wherein the stop-update command is to stop using the communication chip to transmit the updated data to the electronic tag.

10. The method of claim 9, further comprising using the microcontroller to control storing multiple updated data of the multiple electronic tags received by the network modem into the flash memory coupled with the microcontroller through a Serial Peripheral Interface (SPI).

11. A method for managing multiple electronic tags comprising:
starting system initialization;
performing self-testing;
using a microcontroller to control a network modem to connect to a server;
registering a network ID;
waiting for a wake-up command from the server;
receiving and storing updated data of electronic tags;
waiting for an update command from the server;
using the microcontroller to control a communication chip to connect to multiple electronic tags simultaneously;
updating data in each of the multiple electronic tags with a corresponding updated data;
using the network modem to monitor network connection status
receiving update feedback information and battery power level information of an electronic tag by the communication chip if network connection is normal;
determining by the microcontroller there is any information to be uploaded to the server;
uploading at least the update feedback information and/or the battery power level information to the server;
determining an update completion information if each of the multiple electronic tags is updated with corresponding updated data; and
monitoring the network connection status.

12. The method of claim 11, further comprising,
storing the update feedback information and the battery power level information of the electronic tag to a memory if the network connection is not normal;
determining that at least one of the multiple electronic tags is not updated with corresponding updated data; and controlling the communication chip to connect to the at least one electronic tag and transmit the updated data to the at least one electronic tag.

13. The method of claim 12, further comprising, determining by the microcontroller that at least an update feedback information to be uploaded to the server if the network connection is normal;

uploading the update feedback information and/or the battery power level information from the memory to the server; and uploading the update completion information to the server.

* * * * *